(12) United States Patent
Fan et al.

(10) Patent No.: US 6,560,303 B1
(45) Date of Patent: May 6, 2003

(54) JOINT FRAME, CARRIER AND CLOCK SYNCHRONIZATION SCHEME

(75) Inventors: Yigang Fan, Germantown, MD (US); Prakash Chakravarthi, Germantown, MD (US)

(73) Assignee: Comsat Corporation, Clarksburg, MD (US)

( * ) Notice: Subject to any disclaimer, the term of this patent is extended or adjusted under 35 U.S.C. 154(b) by 0 days.

(21) Appl. No.: 09/695,980

(22) Filed: Oct. 26, 2000

(51) Int. Cl.[7] ............................................. H04L 7/00
(52) U.S. Cl. .................... 375/365; 370/514; 370/509
(58) Field of Search ................... 375/362, 365, 375/366, 367, 368, 340, 219; 370/349, 350, 503, 509, 513, 514, 515

(56) References Cited

U.S. PATENT DOCUMENTS

| | | | | |
|---|---|---|---|---|
| 5,276,710 A | * | 1/1994 | Iwasaki | 375/340 |
| 5,434,847 A | * | 7/1995 | Kou | 370/252 |
| 5,596,582 A | * | 1/1997 | Sato et al. | 370/509 |
| 6,002,729 A | | 12/1999 | Schmidt | |
| 6,058,101 A | * | 5/2000 | Huang et al. | 370/208 |
| 6,091,765 A | * | 7/2000 | Pietzold, III et al. | 375/219 |

* cited by examiner

Primary Examiner—Phuong Phu
(74) Attorney, Agent, or Firm—Sughrue Mion, PLLC

(57) ABSTRACT

The present invention provides a method to achieve frame synchronization from a received data sequence before the carrier phase and frequency offset recovery for any MPSK modulated signals on the basis of maximum likelihood theory. Two overhead configurations are considered in developing the frame synchronization algorithms. One overhead configuration consists of a unique word followed by a preamble, and the other consists of unique word only. For the first overhead, the frame synchronization can be decoupled from carrier recovery because the preamble following the unique word is a known sequence pattern. In this case, the maximum-likelihood frame synchronization rule is simply a complex correlation. In second overhead, the unique word is immediately followed by random traffic data and thus the coupling effects are generated between frame synchronization and carrier recovery. These coupling effects are not dominant, however, and may be neglected in actual practice. After the frame synchronization is achieved, the time position is already known. The data-aided algorithms for carrier phase and frequency-offset estimation are derived using maximum likelihood theory.

30 Claims, 16 Drawing Sheets

JOINT FRAME, CARRIER AND CLOCK SYNCHRONIZATION SCHEME

BACKGROUND OF THE INVENTION

1. Field of the Invention

The present invention relates to a method for synchronizing a data sequence, and more specifically, to a synchronization method where frame synchronization occurs prior to carrier and clock recovery and in accordance with a unique word, and does not require differentially decoded or differentially encoded data.

2. Background of the Prior Art

Prior art frame synchronization has developed over the past several decades. J. Massey, "Optimum frame synchronization," *IEEE Trans. Commun.*, Vol. COM-20, pp. 115–119, April 1972, the contents of which is incorporated herein by reference, derived the optimum maximum likelihood (ML) rules to locate a periodically inserted frame-synchronization pattern in random data over an additive white Gaussian noise (AWGN) channel with binary phase shift keying (BPSK) signaling. Massey observed that the ML rule performs at least 3 dB better than the prior art correlation rule.

FIG. 1 illustrates a prior art data sequence for a satellite communications system. An overhead portion of the data sequence includes a preamble 1a that has a length of N symbols, followed by a unique word 1b that has a length of L symbols, and precedes the traffic data field portion 5 of the data sequence. Based on the initial system timing accuracy, prescribed margins $n_1$ and $n_2$ are allocated to assure the occurrence of frame. As a result, if the length of the preamble 1a is N, only $N-n_1-n_2$ symbols of the preamble are actually used for carrier and clock recovery.

FIG. 2 illustrates the prior art data sequence synchronization method. In a first step S1, an input signal is transmitted to a receiver that receives the alternating preamble S3, and carrier and clock recovery is performed S3a using the prior art alternating preamble. Carrier phase and clock timing are not provided in the incoming data sequence. The unique word is then received S5 and applied to a frame synchronization process S5a, and marks the time of occurrence of traffic data. The data sequence transmission is then completed S7.

H. Meyr, "Optimum Frame Synchronization For Asynchronous Packet Transmission," Proc. IEEE ICC, Geneva, Switzerland, pp. 826–830, 1993; and R. Balasubramanian, "A Maximum Likelihood Based Unique Word Detector And Performance Evaluation For Next Generation Linkway," COMSAT Technical Report, 1999, the contents of which are incorporated herein by reference, disclose that prior art frame synchronization methods require the carrier and clock synchronization to be implemented before the frame synchronization. Further, S. I. Sayegh, "Algorithm For Burst Mode Acquisition Using An Alternating Binary Phase Shift Keying Preamble," COMSAT Invention Disclosure Data, Apr. 8, 1997, and H. Meyr, M. Moeneclaey and S. A. Fechtel, "Digital Communication Receivers: Synchronization, Channel Estimation And Signal Processing," John Wiley & Sons, Inc., New York, 1998, the contents of which are incorporated herein by reference, disclose the prior art alternating preamble.

The above-discussed prior art synchronization methods have various disadvantages and problems. For example, not all of the symbols in the alternating preamble can be used for carrier and clock recovery, because the frame starting point has not yet been determined. Further, a two-state phase ambiguity exists in the acquired carrier reference, because the polarity of first symbol used for carrier and clock recovery is not known and could have a value of either 1 or 0 with equal probability. This ambiguity is resolved by the unique word detection that follows the alternating preamble. Also, the design configuration of the prior art overhead portion of the data sequence is inefficient at low data rate and short packet transmissions, because the prior art method uses different portions of the prior art overhead to perform different functions (i.e., one for carrier and clock recovery and the other for frame synchronization) that cannot be performed with only the unique word. These prior art methods are inoperative without two separate and different data synchronization signals.

As illustrated in FIG. 3, Schmidt et al. (U.S. Pat. No. 6,002,729, hereafter "Schmidt"), the contents of which is incorporated herein by reference, discloses a prior art synchronization method that performs frame synchronization S13 before frequency and phase synchronization S15 (i.e., clock and carrier recovery). A data sequence is differentially encoded in a transmitter and sent to the receiver S8. The data sequence is then differentially decoded at the receiver S9. Frame detection S13 is achieved by maximizing a correlation between the differentially decoded data sequence and the complex-conjugated, differentially decoded synchronization sequence S11, which is known at the receiver. The prior art method disclosed in Schmidt cannot be performed without differentially encoded data at the transmitter and differentially decoded data at the receiver.

Moreover, Schmidt also has various problems and disadvantages. For example, Schmidt differentially encodes the data at transmitter and differentially decodes the data at the receiver for the purpose of synchronization, which causes various problems and creates limitations and disadvantages. For example, the receiver must perform additional processing to differentially encode and differentially decode the data. The scheme of Schmidt has an increased complexity due to the additional processing requirements. Thus, the performance of Schmidt is negatively impacted by the data processing requirements. Further, Schmidt does not disclose being able to use an alternating preamble for carrier and clock recovery, as a single synchronization word is used in Schmidt.

SUMMARY OF THE INVENTION

An object of the present invention is to provide an efficient, robust and implementable synchronization method to overcome the various problems and disadvantages of the prior art.

A further object of the present invention is to provide a synchronization method where the data transmission is preceded by a unique word that can be used to perform frame and clock synchronization as well as carrier phase offset and frequency estimation, and does not require an alternating preamble prior to a unique word, thus providing a more compact overhead.

Another object of the present invention is to provide a synchronization method that allows frame detection and clock synchronization to be conducted prior to carrier phase offset and frequency estimation, and wherein a differentially decoded and differentially encoded data sequence is not required, to provide a more efficient transmission.

Yet another object of the present invention is to provide a synchronization method that allows a unique word to perform frame synchronization, followed by a preamble for carrier and clock recovery for use with high data rate transfer applications.

The present invention includes an algorithm to achieve both the frame synchronization and the carrier and clock recovery by using a unique word for any M-ary phase shift keying (MPSK) modulated signals. More specifically, a method of transmitting a data sequence using the maximum likelihood theory is provided, comprising (a) performing a frame synchronization by processing a sampled unique word in said data sequence without differentially encoding and differentially decoding said data sequence, (b) performing a carrier and clock recovery after performing said frame synchronization, and transmitting a portion of said data sequence in accordance with said performing steps (a) and (b).

Additionally, another method of synchronizing a data sequence received in a receiver is provided, comprising processing a sampled unique word that corresponds to a portion of a data sequence to perform a clock synchronization and a frame detection to estimate a starting point of said frame by determining a maximum correlation value from all possible positions of said unique word on said frame, and performing said carrier and clock recovery process that comprises estimating a carrier phase and a frequency offset independently of said processing step.

Further, yet another method of transmitting a data sequence using the maximum likelihood theory is provided, comprising A method of transmitting a data sequence using the maximum likelihood theory, comprising filtering and converting an input signal received from a transceiver into a digital signal corresponding to said data sequence and observing said data sequence for a prescribed time window to sample a unique word comprising an overhead portion of said data sequence, said sampling step minimizing a probability of false detection of said unique word. The method further comprises (a) processing said unique word to perform a clock synchronization and a frame location detection, said frame location being detected by performing an operation on all possible positions of said unique word on said frame independently of a carrier phase and a frequency offset to maximize a magnitude of a function that estimates a starting point of said frame, and said clock synchronization comprising determining a bit timing parameter, (b) processing one of said unique word and an alternating preamble to estimate said carrier phase and said frequency offset, said carrier phase estimate calculated using said estimated frequency offset, and iteratively calculating said estimated frequency offset using a linear function, said frequency offset estimate based on a carrier phase increment, and transmitting a data portion of said data sequence in accordance with results of said processing steps (a) and (b), wherein said method does not require generation of at least one of differentially decoded data and differentially encoded data.

Additionally, to achieve the objects of the present invention and overcome various problems and disadvantages of the prior art, a system for frame synchronization and clock and carrier recovery of a data sequence received from a transmitter is provided, comprising a processor coupled to a receiver, and storage coupled to said processor and comprising software that uses the maximum likelihood theory and is configured for detecting a unique word in said data sequence, performing frame detection and clock synchronization in accordance with said unique word, estimating a carrier phase and frequency offset, and transmitting a data portion of said data sequence, wherein said system does not require one of differentially decoded data and differentially encoded data.

Another system for frame synchronization and clock and carrier recovery of an asynchronous packet is provided, comprising a data sequence having an overhead portion and a data portion, a means for performing a frame synchronization and a clock synchronization using the maximum likelihood theory, said frame being performed in accordance with a unique word positioned in said overhead portion, and a means for performing a carrier and clock recovery after said frame synchronization.

BRIEF DESCRIPTION OF THE DRAWINGS

The accompanying drawings, which are included to provide a further understanding of preferred embodiments of the present invention and are incorporated in and constitute a part of this specification, illustrate embodiments of the invention and together with the description serve to explain the principles of the drawings.

FIG. 8(*c*) illustrates a block diagram for down-conversion according to the preferred embodiments of the present invention;

DETAILED DESCRIPTION OF THE INVENTION

Figure 1:
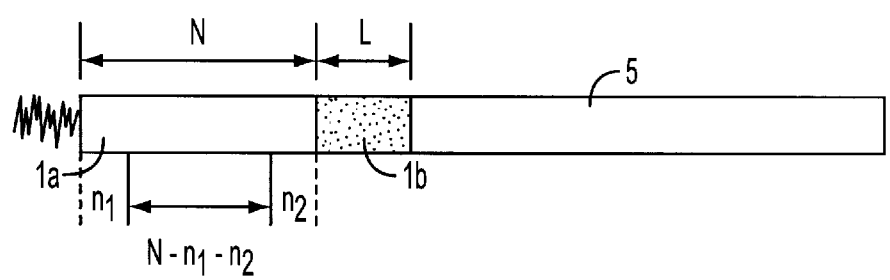
FIG. 1 illustrates a data sequence according to a first prior art synchronization method.
Figure 2:
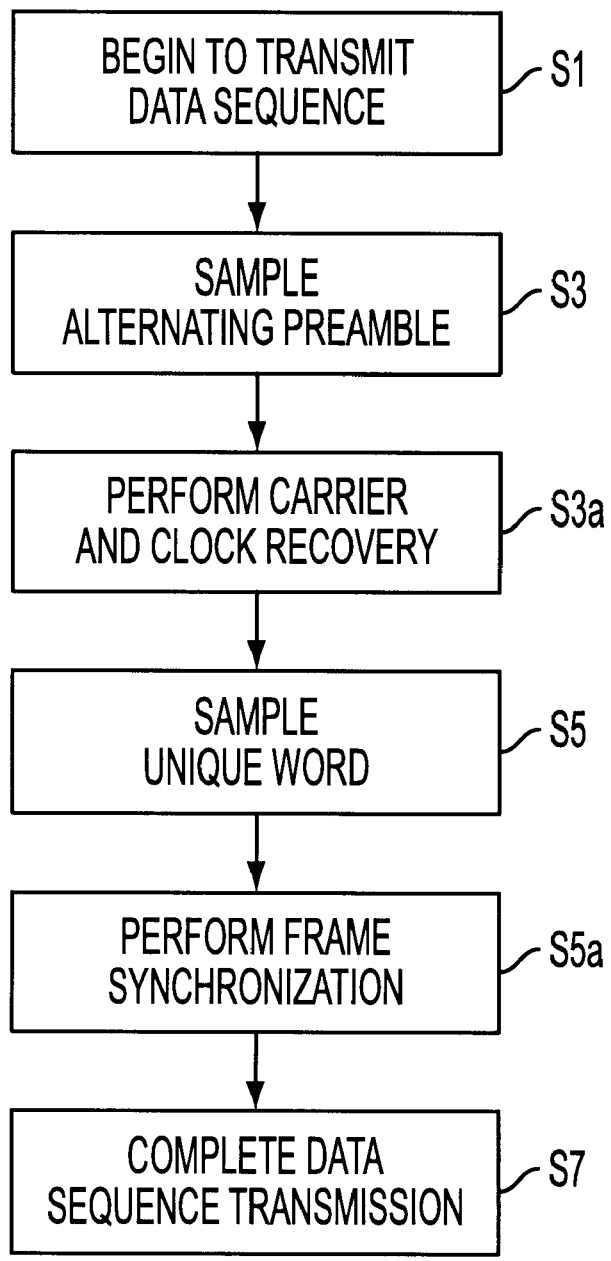
FIG. 2 illustrates the first prior art synchronization method.
Figure 3:
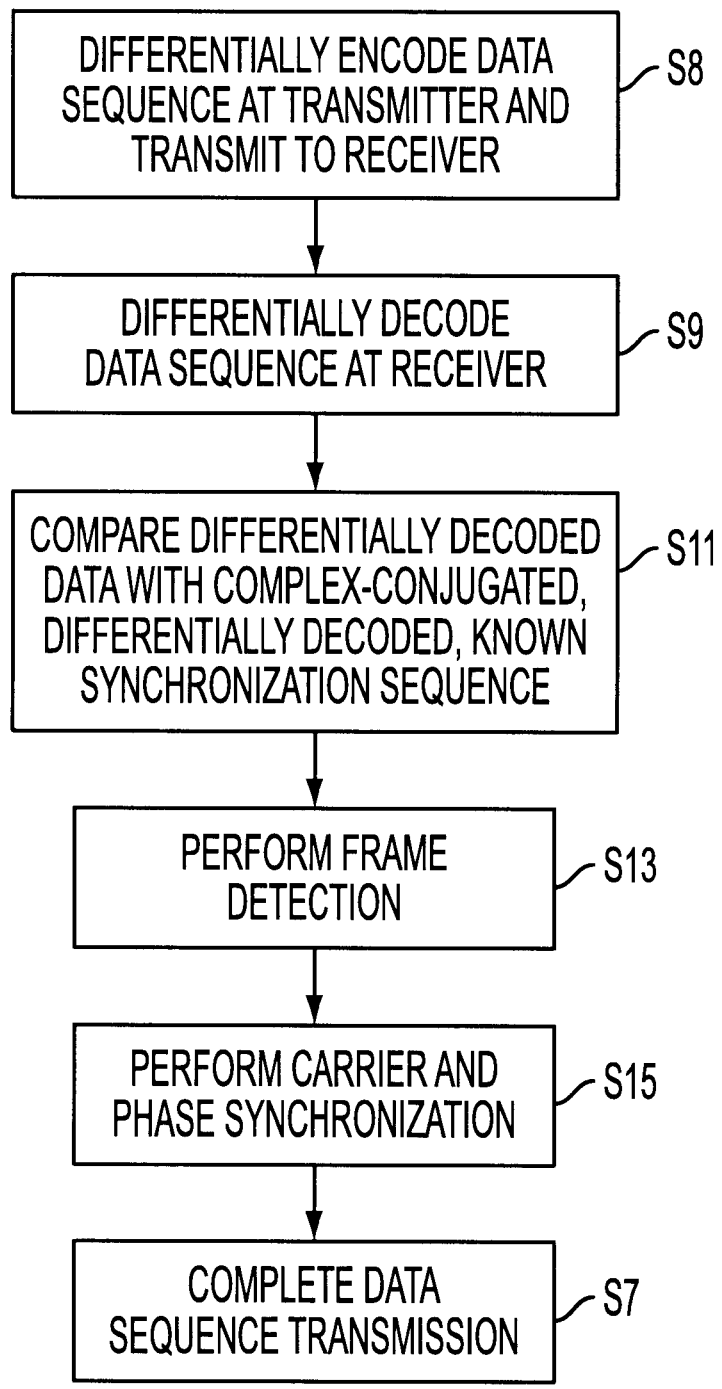
FIG. 3 illustrates a second prior art synchronization method.

Reference will now be made in detail to the preferred embodiment of the present invention, examples of which are illustrated in the accompanying drawings. In the present invention, the terms are meant to have the definition provided in the specification, and are otherwise not limited by the specification.

The preferred embodiments of the present invention include an algorithm that achieves the frame synchronization from the received data sequence before the carrier phase and frequency offset synchronization, and thus provides the time position prior to carrier and clock recovery for any MPSK modulated signals on the basis of maximum likelihood theory. For a given observation where a signal r(t) is received from the transmitter such that $0 \leq t \leq WT$ (i.e., the time of the transmitted signal is within the time window WT), the maximum likelihood estimation selects all the synchronization parameters that maximize the conditional probability $p[r(t)|\mu,\tau,\gamma,\phi]$, wherein $\mu$ is the frame location, $\tau$ is the clock synchronization, $\gamma$ is the carrier phase and $\phi$ is the frequency offset. The frame synchronization scheme does not require the generation of differentially encoded data at the transmitter and differentially decoding the data at the receiver, and thus avoids the prior art disadvantages of Schmidt.

A first preferred embodiment of the present invention, which is discussed in greater detail below, transmits an overhead having the unique word for frame synchronization followed by a preamble for carrier and clock recovery, followed by the traffic data. Since the frame synchronization is first achieved over the unique word, the subsequent preamble can be used for carrier and clock recovery, and the two-state phase ambiguity prior art problem is solved. The first preferred embodiment of the present invention provides efficient transmission for high-data-rate applications since a typical high-data-rate TDMA system generally requires a long preamble for carrier and clock recovery, due to the difficulty of estimating the frequency offset, and a short unique word for frame synchronization.

A second preferred embodiment of the present invention, which is also discussed in greater detail below, unifies the synchronization functions over a unique word in the overhead, followed by the traffic data. The unique word is sampled and processed using synchronization algorithms that provide the efficient frame synchronization. The unique word is then reprocessed for carrier and clock recovery. Thus, the data is stored in memory, which poses no problem with conventional digital technology. The digital signal processing oriented algorithm is of particular interest to achieve synchronization with known symbols during a training period. The second preferred embodiment of the present invention provides an efficient transmission for low-date-rate and short packet applications. Because determining frequency offset and carrier phase for low data rate packet applications does not require a longer overhead, no alternating preamble is required.

Figure 4:
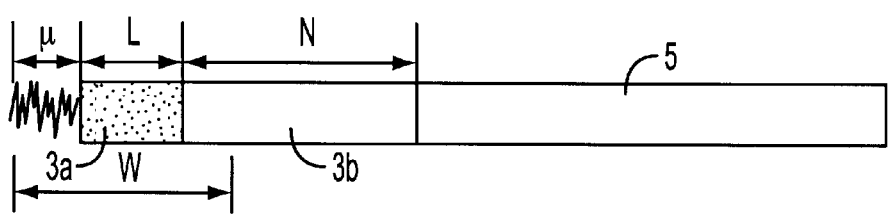
FIG. 4 illustrates a data sequence overhead according to a first preferred embodiment of the present invention.
Figure 5:
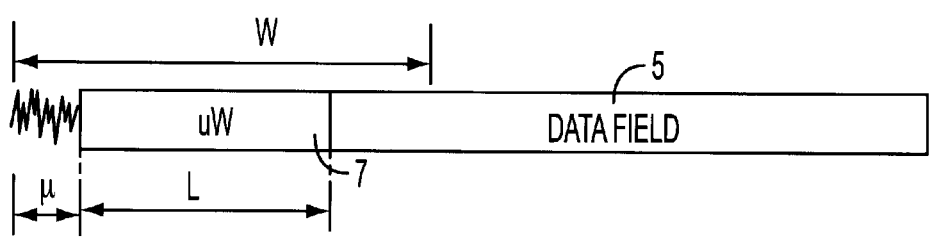
FIG. 5 illustrates a data sequence overhead according to a second preferred embodiment of the present invention.

FIGS. 4 and 5 illustrate the data overhead structures for the first and second preferred embodiments of the present invention, respectively. As illustrated in FIG. 4, the overhead for the first preferred embodiment of the present invention includes the unique word 3a having a length L followed by the preamble 3b having a length N. Frame synchronization is conducted over a length W, and is first achieved over the unique word 3a so that the time position is identified and the preamble 3b is then used for carrier and clock recovery. In addition, since the sequence pattern following the unique word 3a is known in the overhead structure, the frame synchronization does not involve the random data effects that exist for prior art overhead shown in FIG. 1. Thus, a significantly improved frame synchronization performance with less additional implementation complexity occurs, compared to the prior art overhead structure. Because a typical high-data-rate TDMA system requires a long preamble 3b for carrier and clock recovery, whereas the unique word 3a needed for frame synchronization is shorter, the overhead for the first preferred embodiment of the present invention shown in FIG. 4 is efficient, since the whole overhead, including unique word 3a and preamble 3b, can be used for carrier and clock recovery after frame synchronization. The overhead is followed by an unknown number of traffic data symbols in the data field 5.

FIG. 5 illustrates the data sequence overhead according to the second preferred embodiment of the present invention, which includes the unique word 7 having a length of L symbols, followed by an unknown number of traffic data symbols in a data field 5. The actual position of unique word 7 starts from a $\mu$th symbol within the window, wherein the number of possible positions P for the unique word 7 equals P=W−L. Because $0 \leq \mu < P$, a number of unknown data field symbols equal to W−L−$\mu$ that correspond to the data field 5 will be present in the window. Because the receiver does not have any knowledge of the start of the frame, the clock timing, the carrier phase and frequency offset, those parameters are estimated in the synchronization process at the receiver based on the observation of the received signal r(t), which does not require differential decoding or encoding, inside the window for a time $T_0$=WT seconds, which corresponds to W symbols, where T denotes a time duration of a given symbol.

For the preferred embodiments of the present invention, the transmitted symbol sequence $\{a_n\}$, n=1,2, . . . , is selected from a signal constellation. In general, the $a_n$'s can be real or complex, depending on the modulation type. M-ary phase shift keying (MPSK) modulated signals are complex numbers in the form of $e^{j\theta_n}$, where $\theta_n$ is selected from signal constellation set: $2\pi l/M$, l=0,1, . . . ,M−1. The transmitted baseband waveform can be expressed in Equation (1):

$$s(t) = \sum_n a_n g(t - nT), \quad (1)$$

where T and g(t) denote the symbol period and the pulse shaping waveform, respectively. Frame synchronization is achieved during a window having a length of W symbols, which is the interval for observing the received data sequence to search for the location of the unique word 7. Accordingly, the window length W is large enough to include the unique word 7 and has a predetermined length that is chosen based on the initial timing accuracy, since the timing uncertainty in typical TDMA systems can generally be reduced to several symbols once initial system timing acquisition has occurred.

Consider the data sequence transmission over an AWGN channel. The received signal in the complex equivalent baseband notation is shown in Equation (2):

$$r(t) = e^{j(2\pi\gamma t + \phi)}s(t-\tau) + n(t) = e^{j(2\pi\gamma t + \phi)}\sum_n a_n g(t - nT - \tau) + n(t) \quad (2)$$

where $n(t)=n_R(t)+jn_I(t)$ and represents the added complex white Gaussian noise with independent real and imaginary components with the power spectral density of $N_0$ Watts/Hz. $\tau, \gamma$ and $\phi$ represent, respectively, the timing offset, the frequency offset, and the carrier phase, which are all unknown to the receiver. Channel attenuation would simply result in a scaling factor in the final derivation, and is thus ignored as long as the attenuation does not vary over the duration of a burst.

Figure 6:
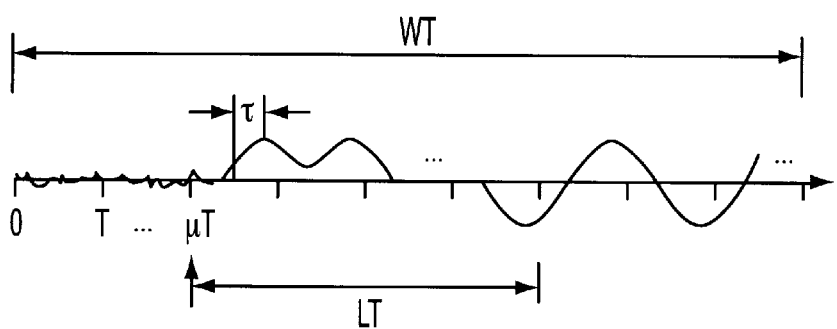
FIG. 6 illustrates a configuration for observing a received signal inside a window in a recover clock for frame detection and clock synchronization according to the first and second preferred embodiments of the present invention.

The detection of the frame starting point is discussed below according to the preferred embodiments of the present invention. FIG. 6 illustrates the data sequence configuration of the received base band signal in the window in the receiver clock for frame starting point detection. Due to the existence of a TDMA guard band between bursts, there is no signal but only noise in the first $\mu(0,1,\ldots,\mu-1)$ symbol periods in the window. As noted above, the unique word starts at the $\mu$th symbol and continues for L symbols. There are also $(W-L-\mu)>0$ unknown data symbols residing in the window. The frame detection starting point is found by determining $\mu$ based on a given observation of the received transmission.

As also illustrated in FIG. 6, clock timing determines the maximum eye-opening instant $\tau$ within each symbol period in the receiver clock. Due to the time differential caused by the propagation time and the clock offset between transmitter and receiver, the boundaries between symbols are not known at the receiver, and are identified during the frame synchronization step according to the first and second preferred embodiments of the present invention.

Figure 7:
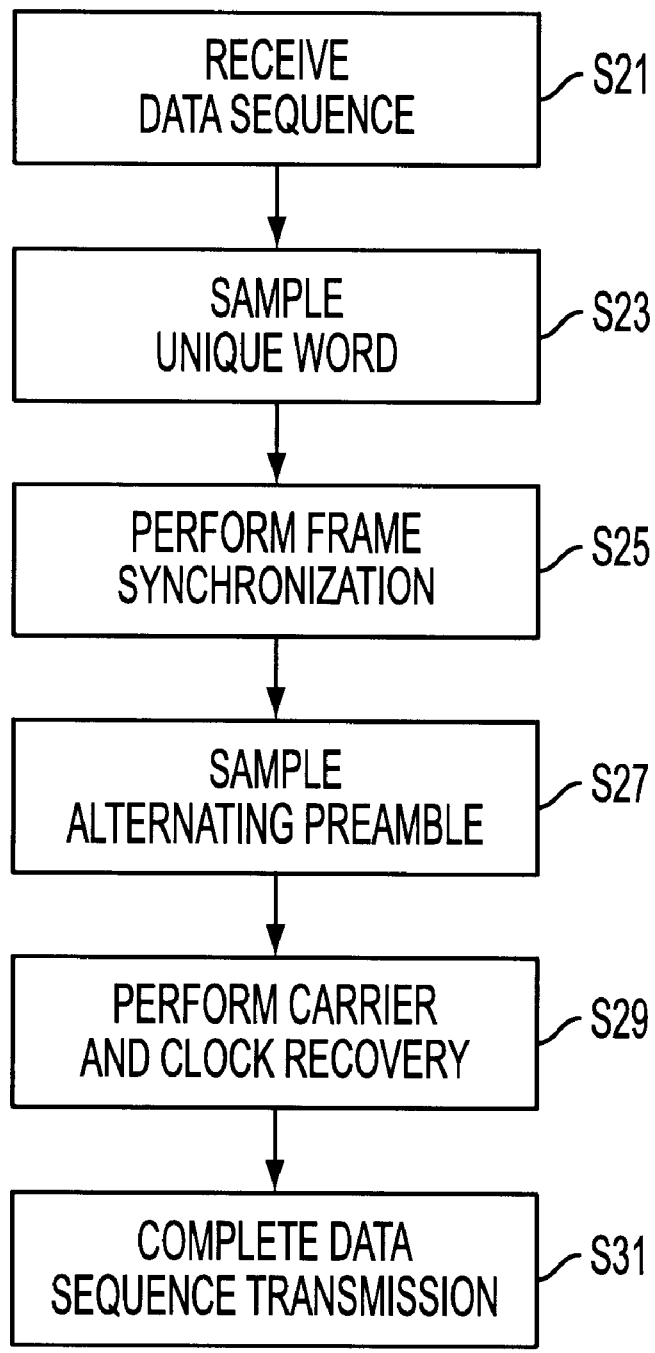
FIG. 7 illustrates a method of completing carrier and clock recovery and frame synchronization in accordance with the first preferred embodiment of the present invention.

FIG. 7 illustrates a method of communicating the data sequence according to the first preferred embodiment of the present invention. A data sequence is received S21 from a transmitter, and the unique word, which is in the overhead of the data sequence as illustrated in FIG. 4, is then sampled S23. Frame synchronization S25 is then performed using the unique word. Next, the alternating preamble, which follows the unique word as illustrated in FIG. 4, is sampled S27 and applied to perform the carrier and clock recovery S29. The data sequence transmission is then completed S31.

Since the preamble 3b sequence pattern following the unique word 3a is known, the maximization of $p[r(t)|\mu,\tau,\gamma,\phi]$ with respect to synchronization parameters is equivalent to the maximization of the likelihood function $$\Lambda(\mu, \tau, \gamma, \phi) = \exp\left\{\text{Re}\left[\frac{1}{N_0}\int_0^{T_0} r(t)e^{-j(2\pi\gamma t + \phi)}s^*(t-\tau)dt\right]\right\} \quad (3)$$

where $\text{Re}\{\cdot\}$ denotes the extraction of the real part, * denotes the complex conjugate, and $T_0$ is the observation time interval over the window, i.e., $T_0=WT$. The frame starts from $\mu$th symbol within the window. $I_0, I_1, \ldots, I_{L-1}$ represents the unique word pattern and $b_L, b_{L+1}, \ldots, b_{W-\mu-1}$ represents the preamble symbol sequence 3 following the unique word 3a inside the window. Substituting $s(t-\tau)$ in Equation (1) into Equation (3) and taking natural logarithm, we obtain $$\lambda(\mu, \tau, \gamma, \phi) = \text{Re}\left\{\frac{e^{-j\phi}}{N_0}\left[\sum_{n=\mu}^{\mu+L-1} I_{n-\mu}^* z(nT+\tau) + \sum_{n=\mu+L}^{W-1} b_{n-\mu}^* z(nT+\tau)\right]\right\} \quad (4)$$

where $$z(nT+\tau) = \int_0^{T_0} r(t)e^{-j2\pi\gamma t}g(t-nT-\tau)dt \quad (5)$$

Since both the unique word 3a and preamble 3b sequences are known, the only unknowns contained in (4) are synchronization parameters $\mu, \phi, \gamma$, and $\tau$. The maximum likelihood estimates of these synchronization parameters maximize the log-likelihood function in Equation (4).

Figure 8A:
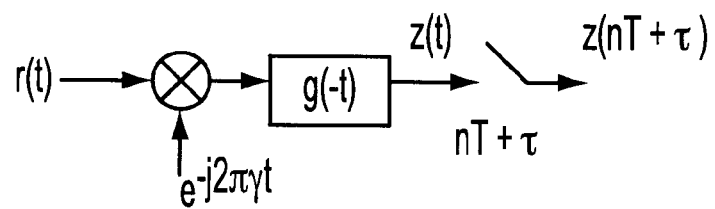
FIGS. 8(*a*) and 8(*b*) illustrate physical interpretations of the approximation process according to the preferred embodiments of the present invention.

The integral part of Equation (5) is physically illustrated in FIG. 8(a). The signal r(t), centering at the frequency offset $\gamma$ between transmitter and receiver, is first down-converted to baseband by multiplying $e^{-j2\pi\gamma t}$, and the obtained baseband signal passes through a matched filter. The output of the matched filter is sampled at instant $nT+\tau$, and it is assumed that the frequency offset is much less than the symbol rate, that is, $|\gamma|<<1/T$. Hence, the bandwidth of the matched filter is much larger than the carrier frequency offset, where the signal r(t) is centered.

Figure 8B:
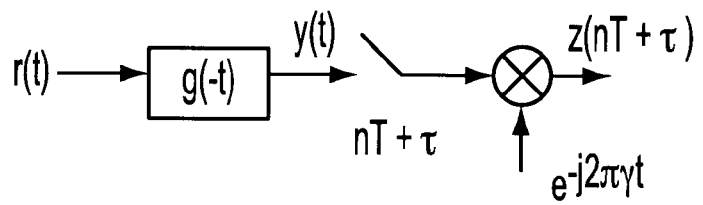

As illustrated in FIG. 8(b), the order of down-conversion and filtering operation may be exchanged without introducing significant distortion. First, the signal r(t) is directly fed into the matched filter. The output of the matched filter is sampled and the resulting digitized signal is then down-converted to baseband by multiplying $e^{-j2\pi\gamma(nT+\tau)}$. Mathematically, FIG. 8(b) can be represented as Equations (6) and (7):

$$z(nT+\tau) \approx e^{-j2\pi\gamma(nT+\tau)}y(nT+\tau) \quad (6)$$

and $$y(nT+\tau) = \int_0^{T_0} r(t)g(t-nT-\tau)dt \quad (7)$$

where, $y(nT+\tau)=Y_R(nT+\tau)+jy_I(nT+\tau)$ are the lowpass signal samples of nth symbol, taken at instant $nT+\tau$ at the outputs of match filters in the in-phase and quadrature dimensions, respectively.

The approximation of FIG. 8(b) simplifies the implementation of estimation process significantly. In the configuration illustrated in FIG. 8(a), the output of the matched filter is computed repeatedly every time the frequency-offset estimate is updated in the maximization process. In the configuration shown in FIG. 8(b), however, the output of the matched filter is only computed once in the estimation process.

Submitting Equation (6) into Equation (4), we obtain the log-likelihood function $$\lambda(\mu, \tau, \gamma, \phi) = \text{Re}\left\{\frac{1}{N_0}\left[\sum_{n=\mu}^{\mu+L-1} I_{n-\mu}^* e^{-j[2\pi\gamma(nT)+\phi]}y(nT+\tau) + \sum_{n=\mu+L}^{W-1} d_{n-\mu}^* e^{-j[2\pi\gamma(nT)+\phi]}y(nT+\tau)\right]\right\} \quad (8)$$

The first sum in Equation (8) gives the complex correlation between the signal samples and the unique word pattern, while the second sum represents the complex correlation between the rest of signal samples and the preamble symbols inside the window. Because the preamble pattern is known, this log-likelihood function becomes a result of complex correlation operation, and the corresponding implementation is simple. The coupling effect of frame synchronization and carrier and clock recovery is weak, and the frame synchronization can be decoupled from carrier phase and frequency estimation under certain approximation. Thus, it is possible to perform frame synchronization before the carrier phase and frequency recovery.

Consider the log-likelihood function in Equation (8) for MPSK modulated signals. The symbols in unique word pattern can be expressed as $I_k = e^{j\theta_k}$, k=0,1, . . . ,L−1, where $\theta_k$ is the phase angle of kth symbol. The symbols in preamble can similarly be expressed as $b_l = e^{j\alpha_l}$, l=L,L+1, . . . ,W−$\mu$−1, where $\alpha_l$ is the phase angle of lth symbol of preamble. For purpose of compact representation, let $[\beta_0, \beta_1, \ldots, \beta_{L-1}\beta_L, \ldots, \beta_{W-\mu-1}] = [\theta_0, \theta_1, \ldots, \theta_{L-1}, \alpha_L, \ldots, \alpha_{W-\mu-1}]$, denoting the phase angles of unique word and preamble sequences inside the window. Equation (8) can be then written in a more compact form as, $$\lambda(\mu, \tau, \gamma, \phi) = \mathrm{Re}\left\{\frac{1}{N_0}\sum_{n=\mu}^{W-1} e^{-j\beta_{n-\mu}} e^{-j[2\pi\gamma(nT)+\phi]} y(nT+\tau)\right\} \quad (9)$$

Let $n_1$ be some constant integer between $\mu$ and W−1. Based on Weighted Mean Value Theorem, the ML-decision rule in Equation (9) can further be approximated as, $$\lambda(\mu, \tau, \gamma, \phi) = \mathrm{Re}\left\{\frac{e^{-j[2\pi\gamma(n_1T)+\phi]}}{N_0}\sum_{n=\mu}^{W-1} e^{-j\beta_{n-\mu}} y(nT+\tau)\right\} = \quad (10)$$

$$\frac{1}{N_0}[A(\tau, \mu)\cos\Phi(\gamma, \phi) + B(\tau, \mu)\sin\Phi(\gamma, \phi)]$$

where $$A(\tau, \mu) = \sum_{n=\mu}^{W-1} [y_R(nT+\tau)\cos\beta_{n-\mu} + y_I(nT+\tau)\sin\beta_{n-\mu}] \quad (11)$$

$$B(\tau, \mu) = \sum_{n=\mu}^{W-1} [-y_R(nT+\tau)\sin\beta_{n-\mu} + y_I(nT+\tau)\cos\beta_{n-\mu}] \quad (12)$$

$$\Phi(\gamma, \phi) = 2\pi\gamma(n_1T) + \phi \quad (13)$$

The necessary conditions for Equation (10) to achieve the maximum are $$\left[A(\tau, \mu)\frac{\partial A(\tau, \mu)}{\partial \mu} + B(\tau, \mu)\frac{\partial B(\tau, \mu)}{d\mu}\right]_{\mu=\hat{\mu}_{ML}} = 0 \quad (14)$$

$$\tan\Phi(\gamma, \phi) = \frac{B(\hat{\tau}_{ML}, \hat{\mu}_{ML})}{A(\hat{\tau}_{ML}, \hat{\mu}_{ML})} \quad (15)$$

These necessary conditions indicate that the frame synchronization can be performed independently of the carrier phase and frequency offset recovery. On the basis of Equation (14), the frame synchronization can be achieved by the maximization of the following equivalent objective function, $$\hat{\mu}_{ML} = \arg\max_{\mu}\{[A(\tau, \mu)]^2 + [B(\tau, \mu)]^2\} \quad (16)$$

where $A(\tau,\mu)$ and $B(\tau,\mu)$ are given in Equations (11) and (12), respectively.

Figure 9:
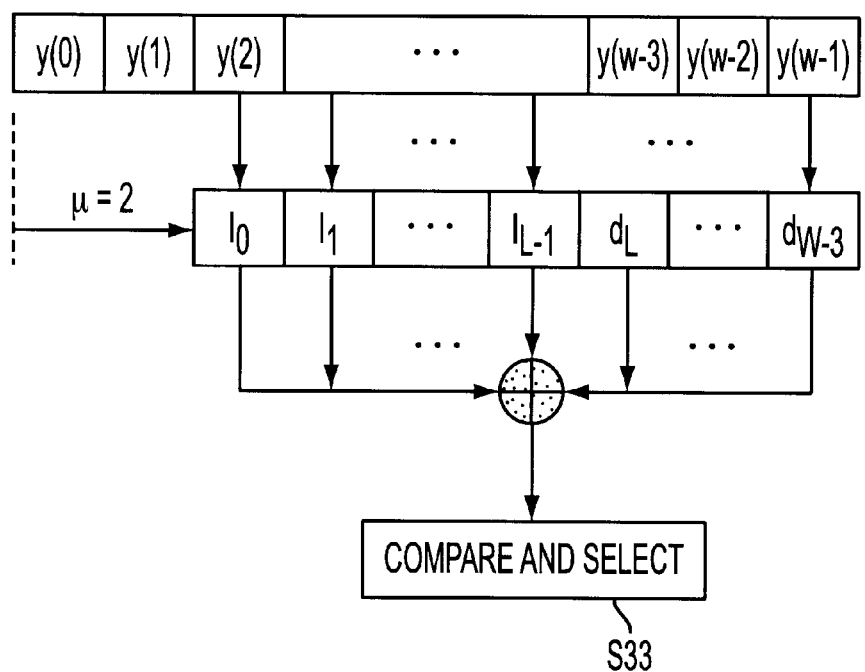
FIG. 9 illustrates a block diagram for a frame detection process according to the preferred embodiment of the present invention, where $\mu$ is set to value of "1"

Equation (16) gives the ML-decision rule for frame synchronization. It is basically a regular complex correlation operation, which is fairly simple to implement. When the magnitude of this complex correlation reaches the maximum, the frame is declared as detected. The block diagram for implementation is illustrated in FIG. 9, and also applies to the second preferred embodiment of the present invention, which is discussed in greater detail further below.

Equations (14) and (16) clearly show that the frame synchronization is independent of carrier phase and frequency estimation errors. However, the bit timing is still coupled with frame synchronization. By looking at the expressions of $A(\tau,\mu)$ and $B(\tau,\mu)$ in Equations (11–12), one may claim that this coupling effect is separable in such a sense that no matter what value the bit timing parameter takes within ($-T/2 \leq \tau \leq T/2$), the objective function given in Equation (16) will reach maximum at same value of frame synchronization parameter $\mu$. In such a case, the clock synchronization may be performed either before or after the frame synchronization. However in order to maximize the frame synchronization performance, the clock timing is performed using an NDA algorithm before frame synchronization, that is, selecting $\tau$ to maximize the following sum of signal sample squares within the window:

$$L_1(\tau) = \sum_{n=0}^{W-1} \{[y_R(nT+\tau)]^2 + [y_I(nT+\tau)]^2\} \quad (17)$$

To solve this optimization problem, one can use the one-dimensional optimization algorithm for a solution. After frame synchronization is achieved, the clock synchronization may be performed once again by using a data-aided algorithm to improve the symbol timing accuracy.

Due to the fact that the unique word is followed by a known pattern of preamble in the first preferred embodiment of the present invention, the ML-decision rule becomes a regular correlation operation for carrier and clock recovery, which is fairly simple to implement. Basically it correlates the stored complex sequence of the received signal vector $y = y_R + jy_I$ with the unique word pattern and the following preamble symbols inside the window. When the magnitude of this complex correlation reaches the maximum, the frame is declared as detected.

Figure 10:
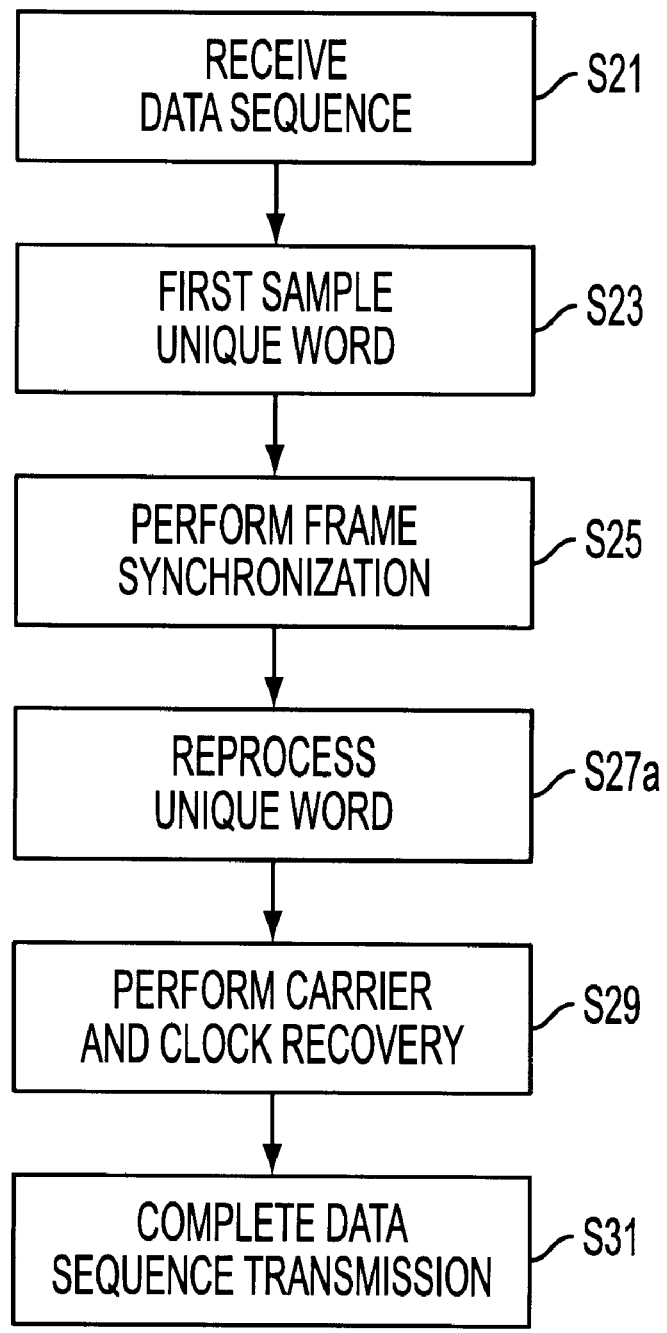
FIG. 10 illustrates a method of completing carrier and clock recovery and frame synchronization in accordance with the second preferred embodiment of the present invention.

FIGS. 10 illustrates the synchronization method according to the second preferred embodiment of the present invention. For example, the data sequence is received in a first step S21, followed by sampling the unique word S23. Then, the frame synchronization, including clock synchronization, occurs S25. The unique word is then reprocessed S27a, followed by the carrier phase and frequency offset estimation S29, which is followed by the data transmission S31.

Figure 11:
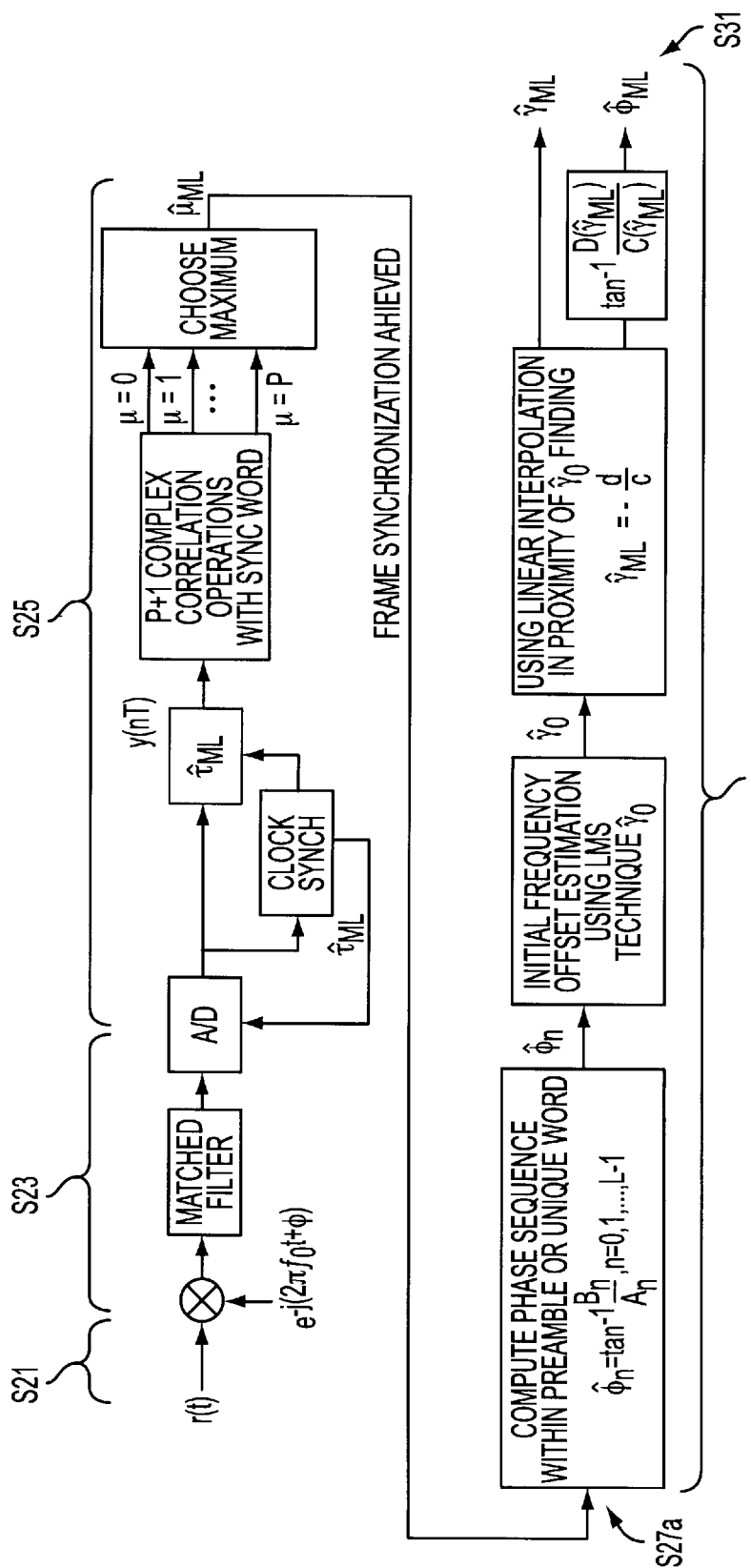
FIG. 11 illustrates a block diagram for a synchronization process according to the preferred embodiments of the present invention.

FIG. 11 illustrates additional details of the first and second preferred embodiments of the present invention, such as the processing of the data sequence in a matched filter and analog-to-digital converter prior to frame clock synchronization S25 and carrier and clock recovery S29. FIG. 11 also illustrates additional details of the frame synchronization S25 and carrier and clock recovery S29 processes, as discussed in greater detail further below.

FIG. 11 can also be applied to the first embodiment of the present invention. For example, carrier and clock recovery can be performed by sampling and processing the alternating preamble 3b. In the second preferred embodiment of the present invention, the unique word 7 is reprocessed in carrier and clock recovery.

According to the second preferred embodiment of the present invention, W–L–$\mu$ random data symbols are included in the window. The maximum-likelihood approach maximizes the detection probability of unique word 7 because it is reasonable to assume all of the possible positions P are a priori equally probable. Since W–L–$\mu$ unknown traffic data symbols 5 included within the window are not part of the unique word, these unknown data dependencies are eliminated using the total probability theorem in Equation (18):

$$p[r(t) | \mu, \tau, \gamma, \phi] = \sum_{all\,d} p[r(t) | \mu, \tau, \gamma, \phi, d] p(d) \quad (18)$$

where d denotes the data symbol. The elimination of the unknown data dependencies is discussed in greater detail below and substantially simplifies the synchronization method according to the second preferred embodiment of the present invention.

Figure 8C:
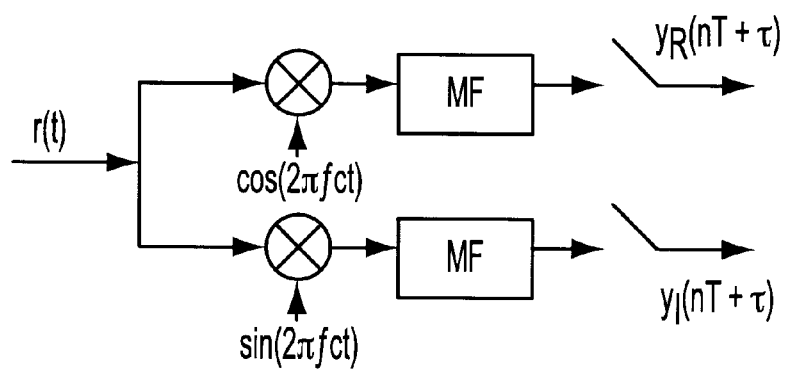

By eliminating quantities independent of the estimated parameters, Equation (18) is maximized by choosing synchronization parameters equal to maximizing the log-likelihood function shown in Equation (19):

$$\lambda_{ML}(\mu, \tau, \gamma, \phi) = \text{Re}\left\{\frac{1}{N_o}\sum_{n=\mu}^{\mu+L-1} I_{n-\mu}^* e^{-j[2\pi\gamma(nT)+\phi]} y(nT+\tau)\right\} + \ln\sum_{all\_d}\exp\left\{\text{Re}\left[\frac{1}{N_o}\sum_{n=L+\mu}^{W-1} d_{n-\mu}^* e^{-j[2\pi\gamma(nT)+\phi]} y(nT+\tau)\right]\right\} - (W-L-\mu)\ln M, \quad (19)$$

where y(nT+$\tau$)=$y_R$(nT+$\tau$)+$jy_I$(nT+$\tau$) represents the lowpass signal samples of nth symbol, taken at time nT+$\tau$ and the outputs of matched filters in the in-phase and quadrature dimensions, respectively, as illustrated in the block diagram for down conversion of FIG. 8(c).

Next, observe that the second sum in Equation (19) can be re-arranged as $$\ln\sum_{all\,d}\exp\left\{\text{Re}\left[\frac{1}{N_0}\sum_{n=L+\mu}^{W-1} d_{n-\mu}^* e^{-j[2\pi\gamma(nT)+\phi]} y(nT+\tau)\right]\right\} = \ln\sum_{all\,d}\prod_{n=L+\mu}^{W-1}\exp\left\{\text{Re}\left[\frac{1}{N_0} d_{n-\mu}^* e^{-j[2\pi\gamma(nT)+\phi]} y(nT+\tau)\right]\right\} = \sum_{n=L+\mu}^{W-1}\ln\sum_{k=1}^{M}\exp\left\{\text{Re}\left[\frac{1}{N_0} e^{-j(2\pi k/M)} e^{-j[2\pi\gamma(nT)+\phi]} y(nT+\tau)\right]\right\} \quad (20)$$

Thus the log-likelihood function of Equation (20) can further be written as, $$\lambda(\mu, \tau, \gamma, \phi) = \text{Re}\left\{\frac{1}{N_0}\sum_{n=\mu}^{\mu+L-1} I_{n-\mu}^* e^{-j[2\pi\gamma(nT)+\phi]} y(nT+\tau)\right\} + \sum_{n=L+\mu}^{W-1}\ln\sum_{k=1}^{M}\exp\left\{\text{Re}\left[\frac{1}{N_0} e^{-j(2\pi k/M)} e^{-j[2\pi\gamma(nT)+\phi]} y(nT+\tau)\right]\right\} - (W-L-\mu)\ln M \quad (21)$$

Equation (19) demonstrates that the synchronization parameters can be estimated by only using the signal sample sequences $y_R$(nT+$\tau$) and $jy_I$(nT+$\tau$), n=0,1,2, ..., W–1, and the first sum in Equations (19) and (21) gives the ordinary complex correlation between the down-converted signal vector and the unique word pattern 7, while the second sum and last term compensate for the effects of the random traffic data 5 following the unique word 7. Due to the random data effects, the implementation of the ML decision rule may be difficult in practice because knowledge of noise power spectral density and evaluations of transcendental functions are required.

A high signal-to-noise ratio (SNR) ML rule can generally be derived to simplify the random data compensation term if the carrier and clock recovery is implemented before frame synchronization, wherein estimated the random data symbols are used for the frame synchronization estimate. In the present invention, a good estimate of data symbol cannot be obtained without performing carrier and clock recovery. A practical implementation requires only evaluation of the correlation rule, because the maximum gain of about 3 dB SNR achieved by including the second and third terms is outweighed by the associated complexity of calculating those terms. Thus, the correlation-based rule provides an optimum result in terms of simplicity and performance.

The compensation for the random data effects introduces the coupling effects between the frame synchronization and carrier recovery as indicated in second sum of Equation (21). However, this coupling effect is weak and the frame synchronization can be decoupled from carrier phase and frequency estimation under certain approximation. Ignoring the traffic data effect results in deleting the second sum and third term in Equation (19) to obtain the synchronization decision rule of Equation (22):

$$\lambda_C(\mu, \tau, \gamma, \phi) = \text{Re}\left\{\frac{1}{N_0}\sum_{n=\mu}^{\mu+L-1} I_{n-\mu}^* e^{-j[2\pi\gamma(nT)+\phi]} y(nT+\tau)\right\}. \quad (22)$$

Equation (22) is similar to the log-likelihood function of Equation (9) except for the correlation limit, and is computationally easier to implement than the exact rule of Equation (19), and is applied for the frame synchronization method according to the first and second preferred embodiments of the present invention.

FIG. 11 illustrates the frame and clock synchronization method according to the second preferred embodiment of the present invention, where Equation (22), based on the Weighted Mean Value Theorem, can be expressed as Equation (23):

$$\lambda_C(\mu, \tau, \gamma, \phi) = \text{Re}\left\{\frac{e^{-j[2\pi\gamma(n_1T)+\phi]}}{N_o}\sum_{n=\mu}^{\mu+L-1} I_{n-\mu}^* y(nT+\tau)\right\}, \quad (23)$$

where $n_1$ is a constant integer having a value between $\mu$ and $\mu$+L–1.

For MPSK signals, the data symbols are in the complex form of $e^{j\Theta_k}$, where $\Theta_k$ is selected from a signal constellation set represented by $\{2\pi l/M, 1=0,1, \ldots M-1\}$. If $I_0, I_1, \ldots, I_{L-1}$ represents the unique word pattern and $d_L, d_{L+1}, \ldots, d_{W-\mu-1}$ represents the traffic data symbol sequence within the window, there are $M^{W-L-\mu}$ possible sequences for the data having a symbol length of $W-L-\mu$. Assuming equal probability distribution, the probability p(d) is equal to $M^{-(W-L-\mu)}$. The symbols in the unique word pattern can be expressed as $I_k=e^{j\Theta_k}$ for $k=0,1, \ldots, L-1$ where $\Theta k$ is the phase angle of kth symbol. As a result, Equation (23) can be rewritten as Equation (24):

$$\lambda(\tau, \mu, \gamma, \phi) = \frac{1}{N_0}[A(\tau, \mu)\cos\Phi(\gamma, \phi) + B(\tau, \mu)\sin\Phi(\gamma, \phi)] \quad (24)$$

where $$A(\tau, \mu) = \sum_{n=\mu}^{\mu+L-1} [y_R(nT+\tau)\cos\Theta_{n-\mu} + y_1(nT+\tau)\sin\Theta_{n-\mu}] \quad (25)$$

$$B(\tau, \mu) = \sum_{n=\mu}^{\mu+L-1} [-y_R(nT+\tau)\sin\Theta_{n-\mu} + y_1(nT+\tau)\cos\Theta_{n-\mu}] \quad (26)$$

and $$\Phi(\gamma,\phi)=2\pi\gamma(n_1T)+\phi. \quad (27)$$

To maximize the value of $\lambda_c$ in Equation (24), the conditions shown in Equations (28) and (29) must be satisfied:

$$\left[A(\tau, \mu)\frac{dA(\tau, \mu)}{d\mu} + B(\tau, \mu)\frac{dB(\tau, \mu)}{d\mu}\right]_{\mu=\hat{\mu}_{ML}} = 0 \quad (28)$$

and $$\tan\Phi(\gamma, \phi) = \frac{B(\tau_{ML}, \mu_{ML})}{A(\tau_{ML}, \mu_{ML})}. \quad (29)$$

Equations (28) and (29) imply that frame synchronization can be performed independently of the carrier phase and frequency offset recovery. Equation (28) also shows that frame synchronization is achieved by maximizing the magnitude of the complex-correlative function shown in Equation (30):

$$\hat{\mu}_{ML} = \arg \max_\mu [A(\tau, \mu)]^2 + [B(\tau, \mu)]^2 \quad (30)$$

where $A(\tau,\mu)$ and $B(\tau,\mu)$ are calculated according to Equations (25) and (26), respectively.

For the first and second embodiments of the present invention, Equations (28–30) clearly show that the frame synchronization is independent of carrier phase and frequency estimation errors. While Equation (28) appears to indicate that the bit timing is coupled with frame synchronization, the expressions of $A(\tau,\mu)$ and $B(\tau,\mu)$ in Equations (25) and (26) demonstrate that the bit timing parameter $\tau$ is independent of frame timing $\mu$. Further, no matter what value the bit timing takes between ($-T/2 \leq \tau \leq T/2$), the value of the function given in Equation (30) is maximized at same value of frame timing parameter $\mu$. Therefore, clock synchronization can be performed either before or after the frame synchronization has been achieved.

Once the bit timing parameter has been fixed and the clock synchronization has been completed, the decision rule of Equation (30) can be implemented as a complex correlation between a stored complex sequence of the received signal vector $y=y_R+jy_I$, in the window and the unique word pattern. As noted above, for a window length W and a unique word length L, P=W−L correlation operations must be performed, each correlation operation corresponding to one position of the unique word with respect to the window. The position that corresponds to a maximum value of these complex correlation values is the detected frame position. At that point, the frame is said to be detected and thus is synchronized. FIG. 9 illustrates a block diagram of the frame synchronization process according to the preferred embodiment of the present invention, where the correlation corresponding to $\mu=1$ is shown. The correlation is shifted from $\mu=0$ to $\mu=P$, comparing and selecting S33 for the maximum correlation to select the frame.

After completing frame synchronization S25, the unique word 7 position has been identified within the window. For the second embodiment of the present invention, the carrier phase and frequency offset estimations S29 are performed over the unique word portion 7, rather than the whole observation window defined above. Because the carrier phase and frequency offset are not performed over the data field 5, the log-likelihood function in Equation (19) can be simplified as Equation (31):

$$\lambda(\gamma, \phi) = \quad (31)$$

$$\text{Re}\left\{\frac{e^{-j\phi}}{N_o}\sum_{n=0}^{L-1} e^{-j[2\pi\gamma(nT)+\theta_n]}y(nT)\right\} = \frac{1}{N_o}[C(\gamma)\cos\phi + D(\gamma)\sin\phi],$$

where $$C(\gamma) = \sum_{n=0}^{L-1}[y_R(nT)\cos(2\pi\gamma nT+\theta_n) + y_1(nT)\sin(2\pi\gamma nT+\theta_n)] \quad (32)$$

and $$D(\gamma) = \sum_{n=0}^{L-1}[-y_R(nT)\sin(2\pi\gamma nT+\theta_n) + y_1(nT)\cos(2\pi\gamma nT+\theta_n)]. \quad (33)$$

Similarly, the necessary conditions for the maximum likelihood estimates of carrier phase and frequency offset to be the maximum likelihood estimates result in Equations (34) and (35):

$$h(\hat{\gamma}_{ML}) = \left[C(\gamma)\frac{dC(\gamma)}{d\gamma} + D(\gamma)\frac{dD(\gamma)}{d\gamma}\right]_{\gamma=\hat{\gamma}_{ML}} = 0 \quad (34)$$

and $$\hat{\phi}_{ML} = \tan^{-1}\frac{D(\hat{\gamma}_{ML})}{C(\hat{\gamma}_{ML})}. \quad (35)$$

The derivatives $dC(\gamma)/d\gamma$ and $dD(\gamma)/d\gamma$ in Equation (35) can easily be derived by differentiating Equations (32) and (33) with trespect to $\gamma$. Equations (34) and (35) indicate that the frequency offset estimation is independent of the carrier phase error. Thus, if the frequency-offset estimate $\hat{\gamma}_{ML}$ is obtained, the carrier phase estimate can be computed explicitly by Equation (35).

However, because Equation (34) cannot be solved explicitly, an iterative scheme is needed. The governing function h(y) of Equation (34) can be closely approximated by a linear function in a relatively large frequency-range around $\hat{\gamma}_{ML}$. Thus, an initial frequency offset estimate in this linear range can be used with linear interpolation to produce the maximum likelihood frequency offset estimate.

The instant carrier phase estimate can be applied to determine the initial frequency offset estimate. The instant carrier phase can be estimated on the per symbol basis similar to Equation (29), as shown in Equation (36):

$$\hat{\phi}_n = \tan^{-1}\frac{B_n}{A_n}, \quad n = 0, 1, 2, \cdots, L-1 \qquad (36)$$

$$A_n = y_R(nT)\cos\theta_n + y_I(nT)\sin\theta_n$$

$$B_n = -y_R(nT)\sin\theta_n + y_I(nT)\cos\theta_n$$

Using the phase sequence computed in Equation (18), the initial frequency offset estimate is calculated using the least mean square (LMS) error technique shown in Equation (19):

$$\hat{\gamma}_o = \frac{1}{2\pi T}\frac{L\sum_{n=0}^{L-1}n\hat{\phi}_n - \sum_{n=0}^{L-1}\hat{\phi}_n}{L\sum_{n=0}^{L-1}n^2 - \left(\sum_{n=0}^{L-1}n\right)^2}. \qquad (37)$$

For Equation (37), various frequencies are chosen adjacent to $\gamma_0$ (i.e., $\hat{\gamma}_{-m}, \ldots, \hat{\gamma}_{-1}, \hat{\gamma}_0, \hat{\gamma}_1, \ldots, \hat{\gamma}_m$) where $\gamma_{m\pm m}=\gamma_0\pm m(10^{-5})R$, where R is the symbol rate and m is typically 1 or 2. Then, those various frequencies are applied to compute function h(y) of Equation (34) at these frequency grid points to obtain $h_i$, i=-m, . . . ,-1,0,1, . . . m. The frequency grid points are interpolated linearly in a least mean squares error scheme to obtain a linear approximation function as $h(\gamma)=c\gamma+d$. Here, the maximum likelihood frequency offset estimate $\hat{\gamma}_{ML}$, which, for a value of $h(\gamma)=0$, can be approximated as $\hat{\gamma}_{ML}=-d/c$, which produces the result shown in Equation (38):

$$\hat{\gamma}_{ML} = -\frac{\left(\sum_{i=-m}^{m}\hat{\gamma}_i^2\right)\left(\sum_{i=-m}^{m}h_i\right) - \left(\sum_{-i=m}^{m}\hat{\gamma}_i\right)\left(\sum_{-i=m}^{m}\hat{\gamma}_ih_i\right)}{m\left(\sum_{i=-m}^{m}\hat{\gamma}_i^2\right) - \left(\sum_{-i=m}^{m}\hat{\gamma}_i\right)}. \qquad (38)$$

With the carrier maximum likelihood frequency offset estimate in Equation (38), the maximum likelihood carrier phase estimate be can directly computed by Equation (35).

If clock synchronization is performed before frame synchronization, the non-data-aided algorithm is used. For example, τ is selected to maximize the function shown in Equation (39), which is constructed from signal samples within the window:

$$L_1(\tau) = \sum_{n=0}^{W-1}\{[y_R(nT+\tau)]^2 + [y_I(nT+\tau)]^2\}. \qquad (39)$$

To maximize Equation (39), a one-dimensional optimization algorithm is applied as a solution. Alternatively, if the clock synchronization is performed after frame synchronization, a data-aided algorithm can be used as discussed in Meyr et al.

An incorrect synchronization probability is used to evaluate frame synchronization performance according to the preferred embodiment of the present invention. The prior art correlation method evaluates frame synchronization performance by setting a detection threshold and analyzing the false-detection and miss-detection probabilities. In the maximum likelihood-based frame synchronization scheme applied in the preferred embodiment of the present invention, a miss-detection scenario does not occur because a maximum correlation value among P+1 correlation values will always be found, and the only unresolved issue is whether the maximum correlation value corresponds to the correct frame position. Therefore, the incorrect synchronization probability evaluates frame synchronization performance for the preferred embodiment of the present invention.

Figure 12:
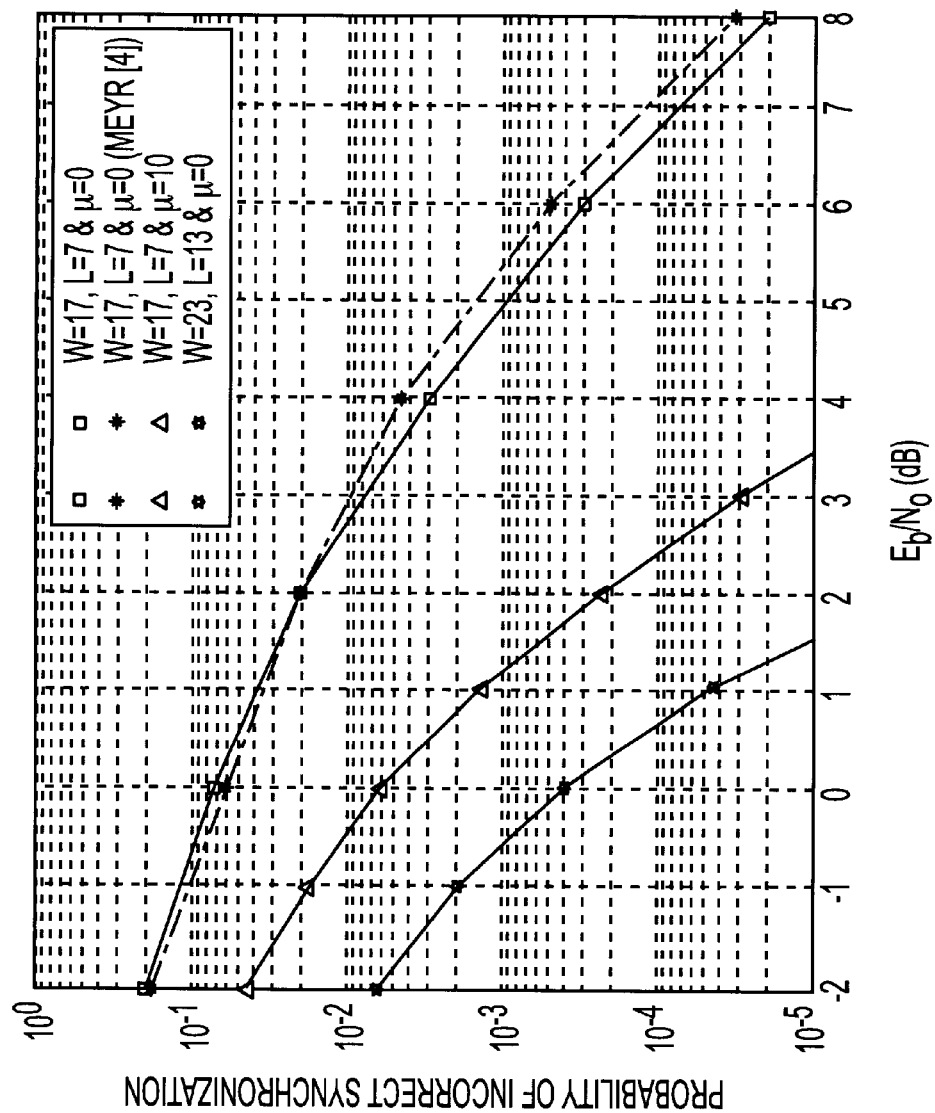
FIG. 12 illustrates a graphical comparison of a computer simulation of the probability of incorrect frame synchronization for the prior art and the second preferred embodiment of the present invention.

Computer simulations were performed using the first and second preferred embodiments of the present invention, and compared to prior art synchronization schemes. Two extreme cases were considered in the computer simulation. In the first case, $\mu$ equals zero, where all the random, unknown data in the window is processed in the correlation. In the second case, which represents the other extreme, $\mu$ equals W−L=10(i.e., the synchronization window does not contain any random data symbols). FIG. 12 illustrates the simulation results of the second preferred embodiment of the present invention for both extreme cases, and shows that the performance in the second extreme case (i.e., no random data signals) is substantially better than the performance of the first extreme case (i.e., all random data signals), because no disturbing effects from random data exist in second case, whereas the random data in the first case includes maximum disturbance effects.

For the unique word position $0 \leq \mu \leq (W-L)$, the synchronization performance falls between the extreme cases. FIG. 12 plots a first set of computer simulation results for the prior art frame synchronization method of Mehlan et al., and a second set of computer simulation results for the performance of frame synchronization according to the second preferred embodiment of the present invention, which is at least as good as the prior art frame synchronization results. FIG. 12 also illustrates that increasing the length of the unique word from 7 to 13 symbols significantly improves the synchronization performance.

Compared with the results shown in FIG. 12, the random data effects result in a synchronization performance not as good as those at which the unique word is followed by a known preamble pattern discussed below. From these two specific examples, however, one can see that as the unique word sequence gets longer, the performance loss due to the random data effects becomes smaller.

Figure 13:
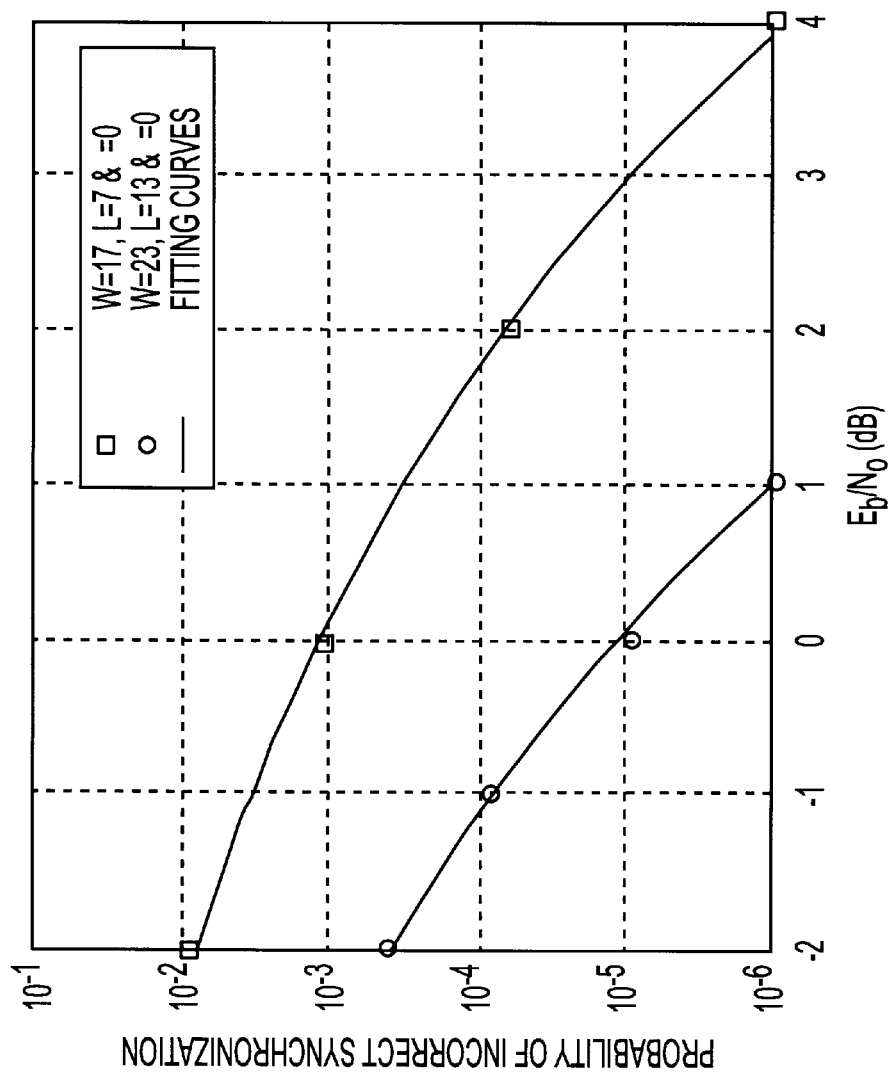
FIG. 13 illustrates graphical results of a computer simulation of the first preferred embodiment of the present invention.

FIGS. 13 illustrates the performance of the first embodiment of the present invention, which is better than the prior art frame synchronization performed after the data is demodulated, because there are no random data effects with the present invention overhead configuration, and the data of the preamble pattern following the unique word is exactly known. In the prior art overhead configuration used by Meyr (shown in FIG. 1), however, the unique word is directly followed by random data and subsequently by the alternating preamble, which affects the synchronization performance.

Figure 14:
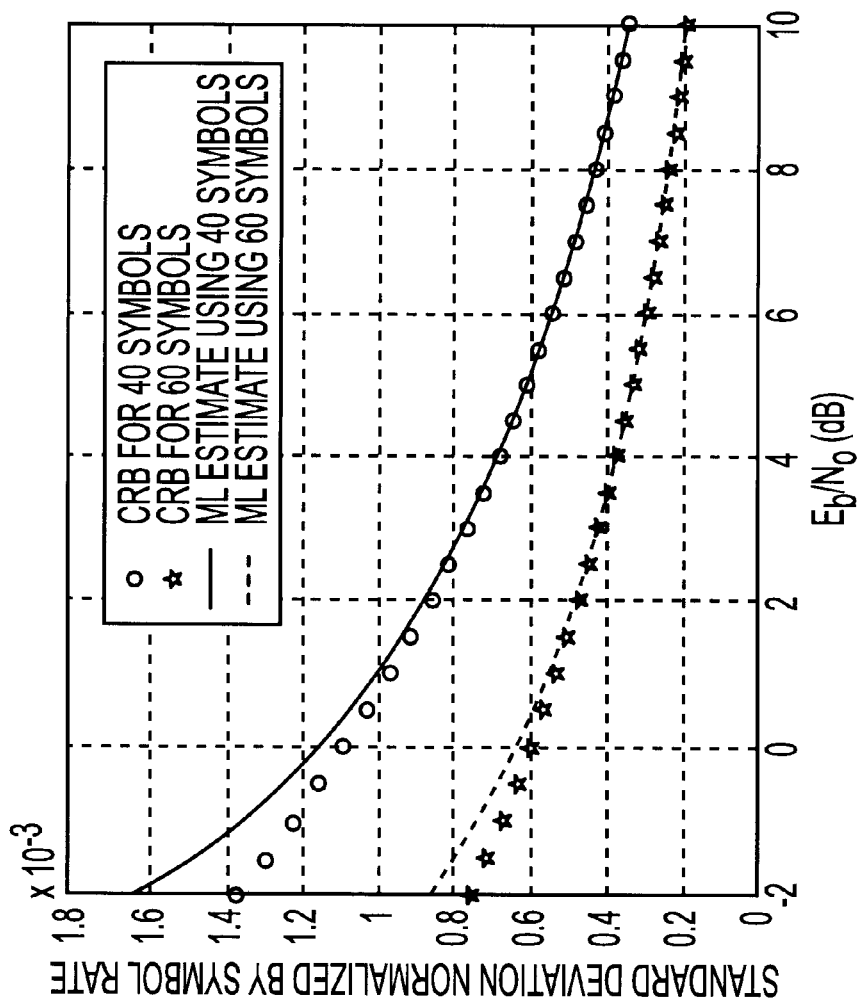
FIG. 14 illustrates a graphical simulation of a computer simulation of the maximum likelihood frequency offset estimate according to the second preferred embodiment of the present invention.
Figure 15:
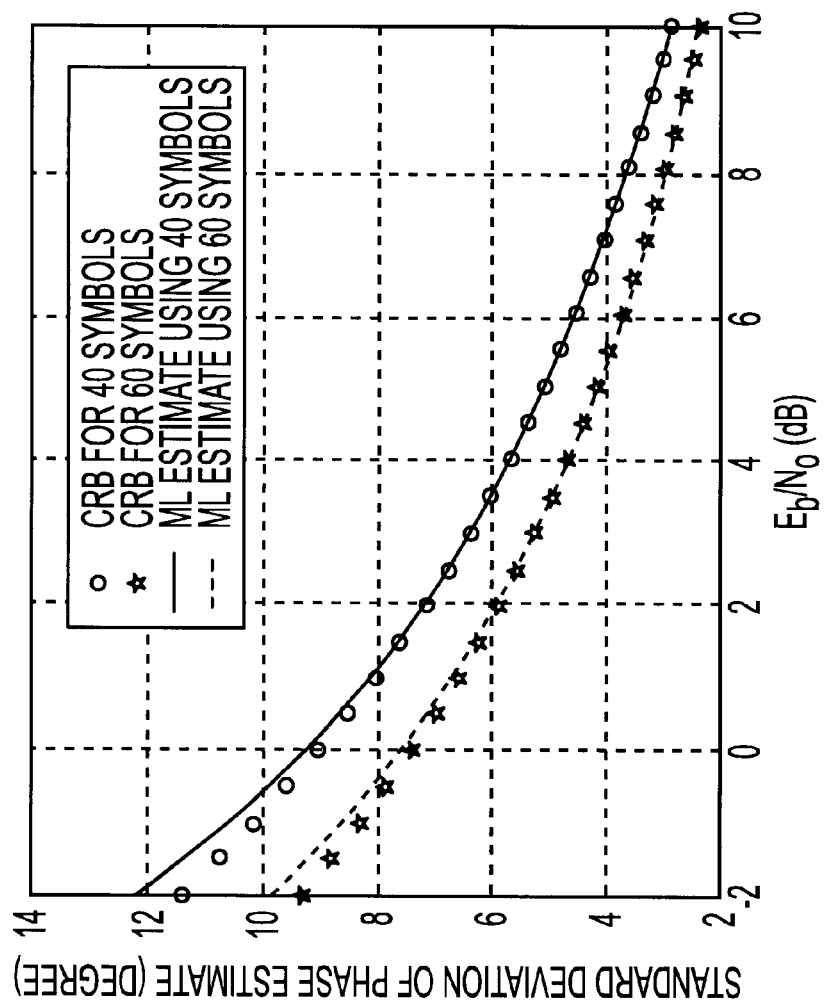
FIG. 15 illustrates a graphical simulation of a computer simulation of the maximum likelihood carrier phase offset estimate according to the second preferred embodiment of the present invention.

For carrier phase and frequency offset recovery, two unique words of length 40 and 60 were selected. FIGS. 14 and 15 illustrate estimation errors from the Monte-Carlo simulations for frequency offset and carrier phase estimations, respectively. For comparison, the corresponding Cramer-Rao bound is shown. FIGS. 14 and 15 illustrate that a longer unique word provides a better good performance for carrier recovery than for frame synchronization. FIG. 14 illustrates that the corresponding frequency offset estimation error is $4.6 \times 10^{-4}$ R, which corresponds to 29.4 Hz, for a symbol rate of R=64 k-sym/sec. FIG. 15 illustrates that if phase estimation error must be within 6 degrees at an operating point of $Eb/N_0=2$ dB, unique word must have at least 60 symbols to achieve this requirement.

The present invention has various advantages. Compared with the prior art methods, the present invention results in more efficient transmission. For example, in the second preferred embodiment of the present invention, the prior art overhead is reduced by using only a unique word to perform the carrier and clock recovery as well as the frame synchronization. Thus, a more compact overhead results, and transmission efficiency is increased. In the second preferred embodiment of the present invention, having an unique word followed by an alternating preamble eliminates random data effects, thus increasing the accuracy of frame synchronization for high data rate applications.

The performance of the prior art maximum likelihood synchronizer of Meyr is very close to the maximum possible limit, but the prior art implementation of the maximum likelihood synchronizer generally involves extensive signal processing. However, the preferred embodiments of the present invention provide a more efficient, practical and implementable scheme to achieve joint frame, carrier and clock synchronization, and the performance is at least as good as the computer simulated prior art methods.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A method of transmitting a data sequence of time divided signals having MPSK modulation and using the maximum likelihood theory, comprising the steps of:
   (a) performing a frame synchronization by processing a sampled unique word in said data sequence without differentially encoding and differentially decoding said data sequence;
   (b) performing a carrier and clock recovery after performing said frame synchronization; and
   transmitting a portion of said data sequence in accordance with said performing steps (a) and (b).

2. The method of claim 1, said performing step (b) comprising performing said carrier and clock recovery by one of (1) reprocessing said unique word and (2) processing an alternating preamble positioned subsequent to said unique word and in an overhead portion of said data sequence.

3. The method of claim 2, wherein said frame is synchronized independently of said carrier and clock recovery.

4. The method of claim 1, wherein said frame synchronization comprises performing an operation on substantially all possible positions of said unique word on said frame to determine a maximum correlation value indicative of a frame starting point.

5. The method of claim 1, wherein said performing step (a) comprises synchronizing said frame before performing said clock synchronization using a data-aided algorithm.

6. The method of claim 1, wherein said performing step (a) comprises synchronizing said frame after performing said clock synchronization using a non-data-aided algorithm.

7. The method of claim 1, said carrier and clock recovery comprising estimating a carrier phase and a frequency offset.

8. The method of claim 7, further comprising iteratively estimating said frequency offset using linear interpolation.

9. The method of claim 7, comprising estimating said frequency offset based on a carrier phase increment.

10. The method of claim 1, further comprising observing said data sequence for a prescribed time window to sample said unique word, wherein a length of said prescribed time window is greater than a length of said unique word, and said unique word length is determined in accordance with an initial timing accuracy of said method.

11. A method of synchronizing a data sequence of time divided signals received in a receiver, comprising:
    processing a sampled unique word that corresponds to a portion of a data sequence to perform a clock synchronization and a frame detection to estimate a starting point of said frame by determining a maximum correlation value from all possible positions of said unique word on said frame; and
    performing said carrier and clock recovery process that comprises estimating a carrier phase and a frequency offset independently of said processing step.

12. The method of claim 11, wherein said processing step comprises detecting said frame prior to synchronizing said clock, and said method does not require at least one of differentially decoded data and differentially encoded data.

13. The method of claim 11, wherein said carrier and clock recovery process is performed by processing one of said unique word and an alternating preamble that follows said unique word.

14. The method of claim 11, wherein said clock is synchronized using a data-aided algorithm when said clock synchronization is performed before said frame detection, and said clock is synchronized using a non-data-aided algorithm when said clock synchronization is performed after said frame detection.

15. The method of claim 11, said clock synchronization comprising maximizing a clock timing within a time window greater than a length of said unique word.

16. A method of synchronizing a data sequence received in a receiver, comprising:
    processing a sampled unique word that corresponds to a portion of a data sequence to perform a clock synchronization and a frame detection to estimate a starting point of said frame by determining a maximum correlation value from all possible positions of said unique word on said frame; and,
    performing said carrier and clock recovery process that comprises estimating a carrier phase and a frequency offset independently of said processing step,
    the method further comprising applying an incorrect synchronization probability to calculate a false-detection and a miss-detection probability of said frame location, said miss-detection probability being substantially equal to zero.

17. A method of synchronizing a data sequence received in a receiver, comprising:
    processing a sampled unique word that corresponds to a portion of a data sequence to perform a clock synchronization and a frame detection to estimate a starting point of said frame by determining a maximum correlation value from all possible positions of said unique word on said frame; and,
    performing said carrier and clock recovery process that comprises estimating a carrier phase and a frequency offset independently of said processing step, the method further comprising obtaining an initial frequency offset value using a least mean square error technique that applies a plurality of adjacent frequencies.

18. A method of transmitting a data sequence using the maximum likelihood theory, comprising:

filtering and converting an input signal received from a transceiver into a digital signal corresponding to said data sequence;

observing said data sequence for a prescribed time window to sample a unique word comprising an overhead portion of said data sequence, said sampling step minimizing a probability of false detection of said unique word;

(a) processing said unique word to perform a clock synchronization and a frame location detection, said frame location being detected by performing an operation on all possible positions of said unique word on said frame independently of a carrier phase and a frequency offset to maximize a magnitude of a function that estimates a starting point of said frame, and said clock synchronization comprising determining a bit timing parameter;

(b) processing one of said unique word and an alternating preamble to estimate said carrier phase and said frequency offset, said carrier phase estimate calculated using said estimated frequency offset, and iteratively calculating said estimated frequency offset using a linear function, said frequency offset estimate based on a carrier phase increment; and transmitting a data portion of said data sequence in accordance with results of said processing steps (a) and (b), wherein said method does not require generation of at least one of differentially decoded data and differentially encoded data.

19. A system for frame synchronization and clock and carrier recovery of a data sequence of time division multiple accessed signals received from a transmitter, comprising:

a processor coupled to a receiver; and storage coupled to said processor and comprising software that uses the maximum likelihood theory and is configured for:
a) detecting a unique word in said data sequence,
b) performing frame synchronization and clock synchronization in accordance with said unique word,
c) estimating a carrier phase and frequency offset on the basis of (1) reprocessing said unique word or (2) processing alternating preambles, and
d) transmitting a data portion of said data sequence, wherein said system does not require one of differentially decoded data and differentially encoded data.

20. The system of claim 19, wherein said frame detection is independent of at least one of said clock synchronization, carrier phase and frequency offset estimation.

21. The system of claim 19, wherein said frame detection comprises said software performing an operation on all possible positions of said unique word on said frame to determine a maximum correlation value indicative of a frame starting point.

22. A system for frame synchronization and clock and carrier recovery of a data sequence received from a transmitter, comprising:

a processor coupled to a receiver; and storage coupled to said processor and comprising software that uses the maximum likelihood theory and is configured for:
a) detecting a unique word in said data sequence,
b) performing frame detection and clock synchronization in accordance with said unique word,
c) estimating a carrier phase and frequency offset, and
d) transmitting a data portion of said data sequence,
wherein said system does not require one of differentially decoded data and differentially encoded data,
wherein said frame synchronization step of said software further comprises calculating a false-detection and a miss-detection probability of said frame synchronization in accordance with an incorrect synchronization probability, and
wherein said miss detection probability is substantially equal to zero.

23. A system for frame synchronization and clock and carrier recovery of a data sequence received from a transmitter, comprising:

a processor coupled to a receiver; and storage coupled to said processor and comprising software that uses the maximum likelihood theory and is configured for:
a) detecting a unique word in said data sequence,
b) performing frame detection and clock synchronization in accordance with said unique word,
c) estimating a carrier phase and frequency offset, and
d) transmitting a data portion of said data sequence, wherein said system does not require one of differentially decoded data and differentially encoded data,
wherein observations of said data sequence are measured during a prescribed time window to sample said unique word, and said prescribed time window is greater than a length of said unique word.

24. The system for frame synchronization and clock and carrier recovery of a data sequence received from a transmitter, comprising:

a process coupled to a receiver; and storage coupled to said processor and comprising software that uses the maximum likelihood theory and is configured for:
a) detecting a unique word in said data sequence,
b) performing frame detection and clock synchronization in accordance with said unique word,
c) estimating a carrier phase and frequency offset, and
d) transmitting a data portion of said data sequence, wherein said system does not require one of differentially decoded data and differentially encoded data,
wherein said estimating step is accomplished by processing one of said unique word for low data rate applications and an alternating preamble that follows said unique word in said data sequence for high data rate applications.

25. A system for frame synchronization and clock and carrier recovery of a data sequence of time division multiple accessed signals, comprising:

a data sequence having an overhead portion and a data portion;

a means for performing a frame synchronization and a clock synchronization using the maximum likelihood theory, said frame synchronization being performed in accordance with a unique word positioned in said overhead portion; and a means for performing a carrier and clock recovery after said frame synchronization by one of reprocessing said unique word and processing an alternating preamble.

26. The system of claim 25, wherein one of said unique word and an alternating preamble located in said overhead portion is processed to perform said carrier and clock recovery.

27. The system of claim 25, wherein said means for performing carrier and clock recovery comprises means for estimating a carrier phase and frequency offset to perform a phase synchronization and a frequency synchronization, wherein said data portion is output in accordance with said frame synchronization, clock synchronization, phase synchronization and frequency synchronization.

28. The system of claim 25, wherein said frame synchronization is independent of said carrier and clock recovery that comprises a carrier phase and a frequency offset estimation.

29. The system of claim 25, wherein said frame synchronization comprises an operation performed on all possible positions of said unique word on said frame to determine a maximum correlation value indicative of a frame starting point.

30. A system for frame synchronization and clock and carrier recovery of a data sequence, comprising:

a data sequence having an overhead portion and a data portion;

a means for performing a frame synchronization and a clock synchronization using the maximum likelihood theory, said frame synchronization being performed in accordance with a unique word positioned in said overhead portion; and a means for performing a carrier and clock recovery after said frame wherein said means for performing carrier and clock recovery comprises means for estimating a carrier phase and frequency offset to perform a phase synchronization and a frequency synchronization, wherein said data portion is output in accordance with said frame synchronization, clock synchronization, phase synchronization and frequency synchronization; and wherein said estimating means comprising an initial frequency offset value obtained by using a least mean square error technique that applies and compares a plurality of adjacent frequencies.

* * * * *